United States Patent
Huang et al.

(10) Patent No.: US 10,694,551 B2
(45) Date of Patent: Jun. 23, 2020

(54) METHOD AND APPARATUS FOR BINDING COMMUNICATION BETWEEN MOBILE DEVICE AND FIXED DEVICE

(71) Applicant: Beijing Kingsoft Internet Security Software Co., Ltd., Beijing (CN)

(72) Inventors: Jian Huang, Beijing (CN); Jin Zou, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 209 days.

(21) Appl. No.: 15/751,362

(22) PCT Filed: Aug. 16, 2016

(86) PCT No.: PCT/CN2016/095542
§ 371 (c)(1),
(2) Date: Feb. 8, 2018

(87) PCT Pub. No.: WO2017/045505
PCT Pub. Date: Mar. 23, 2017

(65) Prior Publication Data
US 2018/0270872 A1    Sep. 20, 2018

(30) Foreign Application Priority Data

Sep. 18, 2015  (CN) .......................... 2015 1 0601708

(51) Int. Cl.
*H04W 76/10* (2018.01)
*H04L 29/06* (2006.01)
(Continued)

(52) U.S. Cl.
CPC ............. *H04W 76/10* (2018.02); *H04L 69/18* (2013.01); *H04M 1/7253* (2013.01);
(Continued)

(58) Field of Classification Search
CPC ........ H04L 67/02; H04L 69/18; H04W 76/10; H04W 76/00–19; H04W 8/005; H04M 1/72527; H04M 1/7253; H04M 2250/06
See application file for complete search history.

(56) References Cited

U.S. PATENT DOCUMENTS 6,272,518 B1 *  8/2001  Blazo .................. G06F 9/45537
                                                          718/100
6,393,477 B1 *  5/2002  Paxhia .................... H04L 29/06
                                                          709/219

(Continued)

FOREIGN PATENT DOCUMENTS

CN    103023989 A  *  4/2013
CN    103023989 A     4/2013

(Continued)

OTHER PUBLICATIONS

International Search Report for PCT/CN2016/095542 dated Nov. 4, 2016; 4 pages including English translation.

*Primary Examiner* — Dung B Huynh
(74) *Attorney, Agent, or Firm* — Schwabe Williamson & Wyatt, PC

(57) ABSTRACT

Embodiments of the present application provide a method and an apparatus for establishing a communication connection between a mobile device and a fixed device. The mobile device receives a broadcast message containing first connection information related to a fixed device sent by the fixed device via the wireless network; determines whether the first connection information in the received broadcast message matches connection information of a fixed device that has been bound to the mobile device, wherein the connection information of the fixed device that has been bound to the mobile device is received from the fixed device by the mobile device via a Universal Serial Bus (USB) connection when the mobile device is connected to the fixed (Continued)

device via the USB connection; if so, returns a second connection information of the mobile device to the matching fixed device via the wireless network, such that the fixed device sends a connection request to the mobile device according to the second connection information; and receives the connection request to establish a communication connection between the mobile device and the fixed device. The present solution solves the problems that a USB cable is required for each communication connection and that mobile devices are subjected to area limitations.

14 Claims, 4 Drawing Sheets

(51) Int. Cl.
    *H04M 1/725*     (2006.01)
    *H04L 29/08*     (2006.01)
(52) U.S. Cl.
    CPC ......... *H04M 1/72527* (2013.01); *H04L 67/02* (2013.01); *H04M 2250/06* (2013.01)

(56) References Cited

U.S. PATENT DOCUMENTS

| | | | | |
|---|---|---|---|---|
| 6,621,834 | B1* | 9/2003 | Scherpbier | H04L 29/06027 370/532 |
| 6,701,361 | B1* | 3/2004 | Meier | H04L 29/12009 370/338 |
| 7,669,232 | B2* | 2/2010 | Jou | H04L 63/06 380/247 |
| 8,391,195 | B1* | 3/2013 | Singh | H04W 76/10 370/310 |
| 8,479,263 | B1* | 7/2013 | Liu | H04L 63/0869 726/3 |
| 9,210,125 | B1* | 12/2015 | Nichols | H04L 61/6081 |
| 9,503,969 | B1* | 11/2016 | Zakaria | H04W 48/16 |
| 9,743,450 | B2* | 8/2017 | Pallen | H04W 12/04 |
| 9,924,243 | B2* | 3/2018 | Lupien | H04W 48/20 |
| 2003/0056002 | A1* | 3/2003 | Trethewey | H04L 67/1002 709/238 |
| 2003/0137970 | A1* | 7/2003 | Odman | H04L 29/06 370/350 |
| 2003/0156558 | A1* | 8/2003 | Cromer | H04W 88/04 370/331 |
| 2004/0151132 | A1* | 8/2004 | Terashima | H04L 12/2803 370/278 |
| 2004/0181692 | A1* | 9/2004 | Wild | H04W 48/14 726/4 |
| 2005/0130647 | A1* | 6/2005 | Matsuda | G06F 3/1203 455/426.2 |
| 2005/0170889 | A1* | 8/2005 | Lum | A63F 13/06 463/39 |
| 2005/0221770 | A1* | 10/2005 | Shipshock | H04W 88/02 455/88 |
| 2006/0023651 | A1* | 2/2006 | Tsuchiuchi | H04W 12/06 370/310 |
| 2006/0251104 | A1* | 11/2006 | Koga | H04W 48/20 370/449 |
| 2008/0003946 | A1* | 1/2008 | Lee | H04W 8/005 455/41.2 |
| 2008/0056722 | A1* | 3/2008 | Hendrix | G08C 23/04 398/108 |
| 2008/0109885 | A1* | 5/2008 | Sim | H04L 67/24 726/5 |
| 2008/0189781 | A1* | 8/2008 | Pathak | H04L 41/00 726/12 |
| 2008/0299966 | A1* | 12/2008 | Masuda | H04L 63/08 455/432.1 |
| 2009/0029691 | A1* | 1/2009 | Shen | H04W 88/08 455/418 |
| 2009/0111378 | A1* | 4/2009 | Sheynman | H04W 8/005 455/41.1 |
| 2009/0119280 | A1* | 5/2009 | Waters | G06F 16/951 |
| 2009/0119427 | A1* | 5/2009 | Takahashi | H04L 29/12839 710/106 |
| 2009/0153342 | A1* | 6/2009 | Thorn | G06F 1/1626 340/669 |
| 2010/0167651 | A1* | 7/2010 | Sakuda | H04W 76/36 455/41.2 |
| 2011/0228699 | A1* | 9/2011 | Shin | H04L 29/1232 370/254 |
| 2011/0292835 | A1* | 12/2011 | Zhu | H04W 28/18 370/255 |
| 2012/0230315 | A1* | 9/2012 | Chang | G06F 3/1292 370/338 |
| 2012/0287914 | A1* | 11/2012 | Smith | H04W 4/06 370/338 |
| 2012/0289159 | A1* | 11/2012 | Palin | H04W 48/14 455/41.2 |
| 2013/0039356 | A1* | 2/2013 | Shibuya | H04W 8/005 370/338 |
| 2013/0044635 | A1* | 2/2013 | Suzuki | H04W 76/14 370/254 |
| 2013/0094538 | A1* | 4/2013 | Wang | H04B 1/707 375/141 |
| 2013/0159535 | A1* | 6/2013 | Zhang | H04W 36/0033 709/227 |
| 2013/0170363 | A1* | 7/2013 | Millington | H04W 76/10 370/252 |
| 2013/0176956 | A1* | 7/2013 | Yamamoto | H04W 76/11 370/329 |
| 2013/0260683 | A1* | 10/2013 | Suzuki | H04W 76/10 455/41.1 |
| 2013/0265997 | A1* | 10/2013 | Gu | H04W 36/0022 370/338 |
| 2013/0332632 | A1* | 12/2013 | Rathi | H04M 1/72527 710/38 |
| 2014/0062657 | A1* | 3/2014 | Adachi | G07C 9/00007 340/5.64 |
| 2014/0092776 | A1* | 4/2014 | Shibata | H04W 84/18 370/254 |
| 2014/0181276 | A1 | 6/2014 | Silverman et al. | |
| 2014/0328285 | A1* | 11/2014 | Sun | H04W 76/14 370/329 |
| 2015/0016417 | A1* | 1/2015 | Dees | H04W 88/08 370/331 |
| 2015/0071271 | A1* | 3/2015 | Smedman | H04W 48/18 370/338 |
| 2015/0072653 | A1* | 3/2015 | Fan | H04W 12/08 455/411 |
| 2015/0139044 | A1* | 5/2015 | Maski | H04W 4/08 370/261 |
| 2015/0208364 | A1* | 7/2015 | Fukuhara | H04W 52/243 455/522 |
| 2015/0222375 | A1 | 8/2015 | Yamada | |
| 2015/0237511 | A1* | 8/2015 | Jackson | H04W 24/02 455/423 |
| 2015/0264723 | A1* | 9/2015 | Cheng | H04W 48/10 455/41.2 |
| 2015/0373657 | A1* | 12/2015 | Kim | H04W 56/002 370/350 |
| 2015/0382194 | A1* | 12/2015 | Kang | H04W 12/06 370/338 |
| 2016/0128109 | A1* | 5/2016 | Widner | H04B 1/3827 455/41.3 |
| 2016/0142911 | A1* | 5/2016 | Kreiner | H04W 48/18 370/328 |
| 2016/0156762 | A1* | 6/2016 | Bailey | H04M 1/72527 455/74.1 |
| 2016/0184635 | A1* | 6/2016 | Kwon | H04W 76/10 455/41.2 |
| 2016/0309481 | A1* | 10/2016 | Verma | H04L 69/14 |
| 2017/0026778 | A1* | 1/2017 | Yamada | H04W 12/04 |

(56) References Cited

U.S. PATENT DOCUMENTS

2017/0223615 A1* 8/2017 Lee .................. H04W 48/14
2018/0191403 A1* 7/2018 Pierson ............... H04B 17/318

FOREIGN PATENT DOCUMENTS

| CN | 103687059 A | 3/2014 |
| CN | 1038888907 A | 6/2014 |
| CN | 104580376 A | 4/2015 |
| WO | 2017/045505 | 3/2017 |

* cited by examiner

METHOD AND APPARATUS FOR BINDING COMMUNICATION BETWEEN MOBILE DEVICE AND FIXED DEVICE

CROSS-REFERENCE TO RELATED APPLICATION

The present application is a national phase entry under 35 U.S.C. § 371 of International Application No. PCT/CN2016/095542, filed Aug. 16, 2016, entitled "METHOD AND APPARATUS FOR ESTABLISHING COMMUNICATION CONNECTION BETWEEN MOBILE DEVICE AND FIXED DEVICE," and claims the priority to Chinese patent application No. 201510601708.7, entitled "METHOD AND APPARATUS FOR ESTABLISHING COMMUNICATION CONNECTION BETWEEN MOBILE DEVICE AND FIXED DEVICE" filed with the State Intellectual Property Office of People's Republic of China on Sep. 18, 2015, which are incorporated herein by reference in their entireties.

TECHNICAL FIELD

The present application relates to the field of communication technology, and more particularly to a method and apparatus for establishing a communication connection between a mobile device and a fixed device.

BACKGROUND

With rapid development of science and technology, mobile devices (such as smart phones) are gradually changing people's life. A user usually needs to operate a mobile device by a fixed device, such as a computer, for example to install applications (trash cleanup application, chat application, etc.) in a smart phone by the computer. Before the user operates the mobile device by the fixed device, it is necessary to establish a communication connection between the mobile device and the fixed device.

A method for connecting a mobile device to a fixed device in the prior art comprises: connecting the mobile device and the fixed device physically via a USB (Universal Serial Bus) cable; and installing corresponding drivers on the fixed device to establish a communication connection between the mobile device and the fixed device.

In the method described above, whenever a communication connection between a mobile device and a fixed device is to be established, a USB cable is required for a physical connection. Also, due to the limited length of the USB cable, areas where the mobile devices can be used are limited.

SUMMARY OF THE INVENTION

The objective of embodiments of the present application is to provide a method and apparatus for establishing a communication connection between a mobile device and a fixed device in order to solve the problems that a USB cable is required for each communication connection and that mobile devices are subject to area limitations in the prior art. The technical solution is described as follows.

In the first aspect, an embodiment of the present application provides a method for establishing a communication connection between a mobile device and a fixed device, which is applied to a mobile device. The method comprises:

receiving, via a wireless network, a broadcast message containing first connection information related to a fixed device sent by the fixed device;

determining whether the first connection information in the received broadcast message matches connection information of a fixed device that has been bound to the mobile device, wherein the connection information of the fixed device that has been bound to the mobile device is received from the fixed device by the mobile device via a Universal Serial Bus (USB) connection when the mobile device is connected to the fixed device via the USB connection;

if so, returning a second connection information of the mobile device to the matching fixed device via the wireless network, such that the fixed device sends a connection request to the mobile device according to the second connection information; and receiving the connection request to establish a communication connection between the mobile device and the fixed device.

Optionally, receiving, via a wireless network, a broadcast message containing first connection information related to the fixed device sent by the fixed device, comprises:

receiving, via the wireless network, the broadcast message containing the first connection information related to the fixed device sent by the fixed device using User Datagram Protocol (UDP); and returning a second connection information of the mobile device to the matching fixed device via the wireless network, comprises:

returning the second connection information of the mobile device to the matching fixed device via the wireless network with the UDP.

Optionally, when the second connection information of the mobile device is returned to the matching fixed device via the wireless network, the method further comprises:

starting a port listening thread to listen on a preset port based on HyperText Transport Protocol (HTTP); and receiving the connection request to establish the communication connection between the mobile device and the fixed device, comprises:

listening with the port listening thread to obtain an HTTP connection request for the preset port of the mobile device; and establishing the communication connection between the mobile device and the fixed device, and feeding a status code corresponding to a connection success status back to the fixed device after the communication connection is established successfully.

Optionally, after establishing the communication connection between the mobile device and the fixed device, the method further comprises:

receiving an HTTP inquiry request periodically sent by the fixed device; and feeding a response message corresponding to the HTTP inquiry request back to the fixed device.

Optionally, the method for establishing a communication connection between a mobile device and a fixed device provided by the embodiment of the present application, further comprises:

outputting first prompt information when no HTTP inquiry request sent by the fixed device is received for a predetermined period of time, the first prompt information being used to prompt that the communication connection between the mobile device and the fixed device has been disconnected.

In the second aspect, an embodiment of the present application provides a method for establishing a communication connection between a mobile device and a fixed device, which is applied to a fixed device. The method comprises:

sending, via a wireless network, a broadcast message containing first connection information related to the fixed device when it is required to establish a communication connection between a mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a Universal Serial Bus (USB) connection when the mobile device is connected to the fixed device via the USB connection;

receiving, via the wireless network, the second connection information related to the mobile device returned by the mobile device;

creating a connection request for the mobile device based on the second connection information; and sending the connection request to the mobile device to establish the communication connection between the mobile device and the fixed device.

Optionally, sending, via a wireless network, a broadcast message containing first connection information related to a fixed device, comprises:

sending, via the wireless network, the broadcast message containing the first connection information related to the fixed device using User Datagram Protocol (UDP); and receiving, via the wireless network, the second connection information related to the mobile device returned by the mobile device, comprises:

receiving, via the wireless network, the second connection information related to the mobile device returned by the mobile device using UDP.

Optionally, creating a connection request for the mobile device based on the second connection information, comprises:

creating an HTTP connection request for a preset port of the mobile device based on the second connection information; and sending the connection request to the mobile device to establish the communication connection between the mobile device and the fixed device, comprises:

sending the HTTP connection request for the preset port of the mobile device to the mobile device, such that the mobile device listens with a started port listening thread to obtain the HTTP connection request for the preset port of the mobile device, establishes the communication connection between the mobile device and the fixed device, and feeds a status code corresponding to a connection success status back to the fixed device after successfully establishing the communication connection; and receiving the status code corresponding to the connection success status fed back by the mobile device to achieve the communication connection between the mobile device and the fixed device.

Optionally, after sending the connection request to the mobile device to establish the communication connection between the mobile device and the fixed device, the method further comprises:

sending an HTTP inquiry request periodically to the mobile device; and re-performing the step of sending the connection request to the mobile device to establish the communication connection between the mobile device and the fixed device, if no response message corresponding to the HTTP inquiry request fed back by the mobile device is received after a predetermined number of times.

Optionally, after sending the connection request to the mobile device to establish the communication connection between the mobile device and the fixed device, the method further comprises:

sending an HTTP inquiry request periodically to the mobile device; and outputting a second prompt message, if no response message corresponding to the HTTP inquiry request fed back by the mobile device is received after a predetermined number of times, the second prompt message being used to prompt that the communication connection between the mobile device and the fixed device has been disconnected.

In the third aspect, an embodiment of the present application provides an apparatus for establishing a communication connection between a mobile device and a fixed device, which is applied to a mobile device. The apparatus comprises:

a broadcast message receiving module, used to receive, via a wireless network, a broadcast message containing first connection information related to a fixed device sent by the fixed device;

a determination module, used to determine whether the first connection information in the received broadcast message matches connection information of a fixed device that has been bound to the mobile device, and if so, trigger a second connection information feedback module, wherein the connection information of the fixed device that has been bound to the mobile device is received from the fixed device by the mobile device via a Universal Serial Bus (USB) connection when the mobile device is connected to the fixed device via the USB connection;

the second connection information feedback module, used to return a second connection information of the mobile device to the matching fixed device via the wireless network, such that the fixed device sends a connection request to the mobile device according to the second connection information; and a communication connection establishment module, used to receive the connection request to establish a communication connection between the mobile device and the fixed device.

Optionally, the broadcast message receiving module is specifically used to:

receive, via the wireless network, the broadcast message containing the first connection information related to the fixed device sent by the fixed device using User Datagram Protocol (UDP); and the second connection information feedback module is specifically used to return the second connection information of the mobile device to the matching fixed device via the wireless network using UDP.

Optionally, the apparatus for establishing a communication connection between a mobile device and a fixed device provided by the embodiment of the present application, further comprises:

a thread starting module, used to start a port listening thread to listen on a preset port based on Hyper Text Transport Protocol (HTTP) when the second connection information of the mobile device is returned to the matching fixed device via the wireless network; and the communication connection establishment module is specifically used to:

listen with the port listening thread to obtain an HTTP connection request for the preset port of the mobile device; and establish the communication connection between the mobile device and the fixed device, and feed a status code corresponding to a connection success status back to the fixed device after successfully establishing the communication connection.

Optionally, the apparatus for establishing a communication connection between a mobile device and a fixed device provided by the embodiment of the present application, further comprises:

an inquiry request receiving module, used to receive an HTTP inquiry request periodically sent by the fixed device after the communication connection between the mobile device and the fixed device is established; and a response message feedback module, used to feed a response message corresponding to the HTTP inquiry request back to the fixed device.

Optionally, the apparatus for establishing a communication connection between a mobile device and a fixed device provided by the embodiment of the present application, further comprises:

a first prompt information output module, used to output first prompt information when no HTTP inquiry request sent by the fixed device is received for a predetermined period of time, the first prompt information being used to prompt that the communication connection between the mobile device and the fixed device has been disconnected.

In the fourth aspect, an embodiment of the present application provides an apparatus for establishing a communication connection between a mobile device and a fixed device, which is applied to a fixed device. The apparatus comprises:

a broadcast message sending module, used to send, via a wireless network, a broadcast message containing first connection information related to the fixed device when it is required to establish a communication connection between a mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a Universal Serial Bus (USB) connection when the mobile device is connected to the fixed device via the USB connection;

a second connection information receiving module, used to receive, via the wireless network, the second connection information related to the mobile device returned by the mobile device;

a connection request creating module, used to create a connection request for the mobile device based on the second connection information; and a connection request sending module, used to send the connection request to the mobile device to establish the communication connection between the mobile device and the fixed device.

Optionally, the broadcast message sending module is specifically used to:

send the broadcast message containing the first connection information related to the fixed device via the wireless network using User Datagram Protocol (UDP); and the second connection information receiving module is specifically used to receive, via the wireless network, the second connection information related to the mobile device returned by the mobile device using UDP.

Optionally, the connection request creating module is specifically used to:

create an HTTP connection request for a preset port of the mobile device based on the second connection information; and the connection request sending module is specifically used to: send the HTTP connection request for the preset port of the mobile device to the mobile device, such that the mobile device listens with a started port listening thread to obtain the HTTP connection request for the preset port of the mobile device, establishes the communication connection between the mobile device and the fixed device, and returns a status code corresponding to a connection success status to the fixed device after successfully establishing the communication connection; and receive the status code corresponding to the connection success status fed back by the mobile device to achieve the communication connection between the mobile device and the fixed device.

Optionally, the apparatus for establishing a communication connection between a mobile device and a fixed device provided by the embodiment of the present application, further comprises:

an inquiry request sending module, used to send an HTTP inquiry request periodically to the mobile device, after the connection request is sent to the mobile device to establish the communication connection between the mobile device and the fixed device; and a communication connection reestablishment module, used to resend the connection request to the mobile device to establish the communication connection between the mobile device and the fixed device if no response message corresponding to the HTTP inquiry request fed back by the mobile device is received after a predetermined number of times.

Optionally, the apparatus for establishing a communication connection between a mobile device and a fixed device provided by the embodiment of the present application, further comprises:

an inquiry request sending module, used to send an HTTP inquiry request periodically to the mobile device, after the connection request is sent to the mobile device to establish the communication connection between the mobile device and the fixed device; and a second prompt message output module, used to output a second prompt message if no response message corresponding to the HTTP inquiry request fed back by the mobile device is received after a predetermined number of times, the second prompt message being used to prompt that the communication connection between the mobile device and the fixed device has been disconnected.

In the fifth aspect, an embodiment of the present application provides an mobile device comprising a housing, a processor, a memory, a circuit board and a power circuit, wherein the circuit board is disposed inside a space enclosed by the housing, and the processor and the memory are disposed on the circuit board; the power circuit is used to supply power to various circuits or elements of the mobile device; the memory is used to store an executable program code; the processor executes a program corresponding to the executable program code by reading the executable program code stored in the memory to perform the method for establishing a communication connection between a mobile device and a fixed device applied to a mobile device.

In the sixth aspect, an embodiment of the present application provides a fixed device comprising a housing, a processor, a memory, a circuit board and a power circuit, wherein the circuit board is disposed inside a space enclosed by the housing, and the processor and the memory are disposed on the circuit board; the power circuit is used to supply power to various circuits or elements of the fixed device; the memory is used to store an executable program code; the processor executes a program corresponding to the executable program code by reading the executable program code stored in the memory to perform the method for establishing a communication connection between a mobile device and a fixed device applied to a fixed device.

In the seventh aspect, an embodiment of the present application provides an application program for performing a method for establishing a communication connection between a mobile device and a fixed device applied to a mobile device when being executed.

In the eighth aspect, an embodiment of the present application provides an application program for performing a method for establishing a communication connection between a mobile device and a fixed device applied to a fixed device when being executed.

In the ninth aspect, an embodiment of the present application provides a storage medium for storing an application program, which is used to perform a method for establishing a communication connection between a mobile device and a fixed device applied to a fixed device.

In the tenth aspect, an embodiment of the present application provides a storage medium for storing an application program, which is used to perform a method for establishing a communication connection between a mobile device and a fixed device applied to a mobile device.

Compared with the prior art, the solutions provided by the embodiments only need to establish a communication connection via a USB cable between the mobile device and the fixed device once, and the subsequent communication connections can be completed without the USB cable. Thus, the solutions provided by the embodiments solve the problems that a USB cable is required for each communication connection and that mobile devices are subject to area limitations in the prior art.

BRIEF DESCRIPTION OF THE DRAWINGS

In order to explain the technical solutions of embodiments of the present application or of the prior art, a simple introduction of the drawings required in the description of the embodiments and of prior art will be given. Obviously, the drawings described below are just some embodiments of the present application and other drawings may be obtained by one of ordinary skill in the art without any creative efforts based on these drawings.

DETAILED DESCRIPTION OF THE INVENTION

The technical solutions of the present application will be described clearly and completely in connection with the drawings of embodiments of the present application. Obviously, the embodiments described are only parts of the embodiments of the present application, instead of all the embodiments. All other embodiments obtained by one of ordinary skill in the art based on the embodiments herein without any creative efforts are within the scope of the present application.

In order to solve the problems that a USB cable is required for each communication connection and that mobile devices are subject to area limitations, embodiments of the present application provide a method and apparatus for establishing a communication connection between a mobile device and a fixed device.

First, a method for establishing a communication connection between a mobile device and a fixed device provided by an embodiment of the present application will be described.

In the first aspect, an embodiment of the present application provides a method for establishing a communication connection between a mobile device and a fixed device, from perspective of mobile device.

It should be noted that, in practice, the mobile device may include a handheld device, such as smart phone, tablet computer and the like, and the fixed device may include a device such as desktop computer, laptop computer and the like.

Moreover, a functional software for implementing the method for establishing a communication connection between a mobile device and a fixed device provided in the embodiment may be a dedicated client software installed in a mobile device, or may also be a plug-in of an assistant client software or of a management client software installed in a mobile device. These are reasonable.

Figure 1:
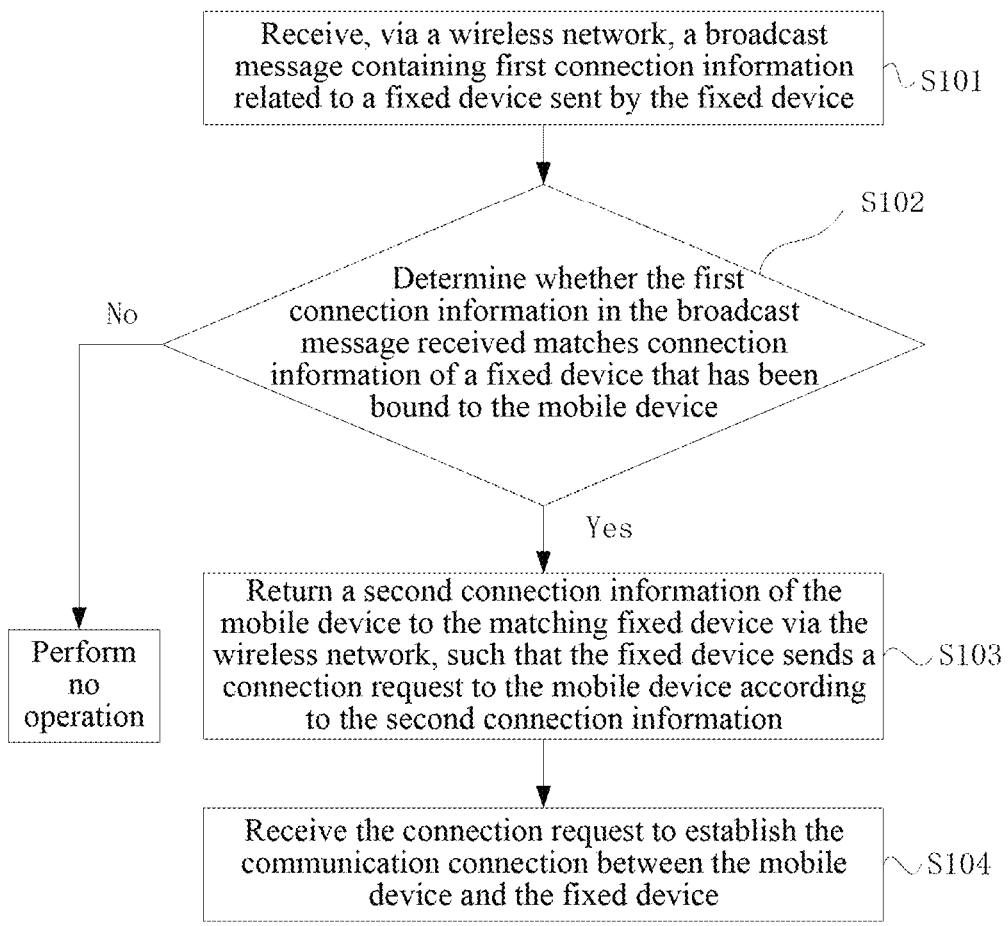
FIG. 1 is a flow chart of a method for establishing a communication connection between a mobile device and a fixed device, provided for a mobile device.

As shown in FIG. 1, the method for establishing a communication connection between a mobile device and a fixed device provided by the embodiment may comprise the following steps S101-S104.

In S101, a broadcast message containing first connection information related to a fixed device sent by the fixed device is received via a wireless network.

The fixed device may send a broadcast message containing first connection information related to the fixed device via a wireless network when it is required to establish a communication connection between the mobile device and the fixed device. Accordingly, the mobile device may receive, via the wireless network, the broadcast message containing the first connection information related to the fixed device sent by the fixed device.

The way to trigger the establishing of a communication connection between a mobile device and a fixed device may include a manual triggering by a user or a non-manual triggering by a user. For example, as to the manual triggering by a user, the user may perform a predetermined operation on an interaction interface presented by the fixed device to trigger the establishing of a communication connection between a mobile device and a fixed device. The predetermined operation may include but is not limited to an operation of clicking a button, a predetermined gesture operation or the like. As to the non-manual triggering by a user, the user may start a functional software, which implements the method for establishing a communication connection between a mobile device and a fixed device, in the fixed device to automatically trigger the establishing of a communication connection between a mobile device and a fixed device. These are reasonable.

It should be noted that, prerequisites for the implementation of the solution provided by the embodiment are that: (1) the mobile device and the fixed device are in the same wireless network, that is, share the same wireless network; (2) the mobile device has successfully established a communication connection with the fixed device via a USB cable once, and after the mobile device establishes the communication connection with the fixed device via the USB cable, the fixed device sends its own connection information to the mobile device, and the mobile device binds and stores the connection information after receiving the connection information sent by the fixed device. The connection information may include but is not limited to MAC address, IP address, name of the fixed device, etc., wherein the IP address is Internet Protocol address, the MAC (Media Access Control) address is the physical address. The mobile device may store the received connection information of the fixed device into a configuration file, and the present application is not limited thereto.

It will be understood that for the above prerequisites, the fixed device may automatically send its own connection information to the mobile device after the mobile device establishes the communication connection with the fixed device via the USB cable. Of course, the fixed device may pop up an inquiry message about whether the mobile device is to be bound, and when the user issues a binding instruction by responding to the inquiry message, the fixed device sends its own connection information to the mobile device. The inquiry message about whether the mobile device is to be bound may refer to FIG. 5, and it is not limited thereto.

In S102, it is determined whether the first connection information contained in the received broadcast message matches connection information of a fixed device that has been bound to the mobile device; if the first connection information matches the connection information of the fixed device that has been bound to the mobile device, S103 is performed; otherwise, no operation is performed.

After receiving the broadcast message containing the first connection information related to the fixed device sent by the fixed device, the mobile device may determine whether the first connection information contained in the received broadcast message matches connection information of a fixed device that has been bound to the mobile device, and perform different operations according to different determination results. Specifically, when it is determined that the first connection information contained in the received broadcast message matches the connection information of the fixed device that has been bound to the mobile device, step S103 may be performed to proceed with the establishment process of communication connection. When it is determined that the first connection information contained in the received broadcast message does not match the connection information of the fixed device that has been bound to the mobile device, no operation is performed.

It is to be noted that the connection information of the fixed device that has been bound to the mobile device is received from the fixed device by the mobile device via a Universal Serial Bus (USB) connection when the mobile device is connected to the fixed device via the USB connection, and the mobile device may receive connection information sent by multiple fixed devices and bind and store the connection information.

In S103, a second connection information of the mobile device is returned to the matching fixed device via the wireless network, such that the fixed device sends a connection request to the mobile device according to the second connection information;

when it is determined that the first connection information contained in the received broadcast message matches the connection information of the fixed device that has been bound to the mobile device, the mobile device may return a second connection information thereof to the matching fixed device via the wireless network, so as to cause the fixed device to actively request a communication connection with the mobile device. Thus, the fixed device may, after receiving the second connection information, create a connection request for the mobile device based on the second connection information and send the connection request to the mobile device.

The second connection information of the mobile device may include but is not limited to MAC address, IP address, name of the mobile device and the like.

In S104, the connection request is received to establish a communication connection between the mobile device and the fixed device.

After the connection request sent by the fixed device is received, the communication connection between the mobile device and the fixed device may be established.

It should be noted that, after the connection request is received, a method in the prior art may be used to implement the specific process of establishing the communication connection between the mobile device and the fixed device.

Compared with the prior art, the solution provided by the embodiment only needs to establish a communication connection via a USB cable between the mobile device and the fixed device once, and the subsequent communication connections may be completed without the USB cable. Thus, the solution provided by the embodiment solves the problems that a USB cable is required for each communication connection and that mobile devices are subject to area limitations in the prior art.

Specifically, receiving, via a wireless network, a broadcast message containing first connection information related to a fixed device sent by the fixed device may comprise:

receiving, via the wireless network, the broadcast message containing the first connection information related to the fixed device sent by the fixed device using User Datagram Protocol (UDP).

Accordingly, sending a second connection information of the mobile device to the matching fixed device via the wireless network, may comprise:

sending the second connection information of the mobile device to the matching fixed device via the wireless network using UDP.

The communication protocol used by the fixed device to send a broadcast message is not limited to UDP, and other existing communication protocols may be used. These are reasonable. Moreover, a method in the prior art may be used to implement the receipt of, via a wireless network, a broadcast message containing first connection information related to a fixed device sent by the fixed device using UDP and the returning of a second connection information of the mobile device to the matching fixed device via the wireless network using UDP.

Specifically, in practice, HyperText Transport Protocol (HTTP) may be used to complete the establishment of communication connection. Thus, when the second connection information of the mobile device is returned to the matching fixed device via the wireless network, the solution provided by the embodiment may further comprise:

starting a port listening thread to listen on a preset port based on Hyper Text Transport Protocol (HTTP).

Accordingly, receiving the connection request to establish the communication connection between the mobile device and the fixed device, may comprise:

listening with the port listening thread to obtain an HTTP connection request for the preset port of the mobile device; and establishing the communication connection between the mobile device and the fixed device, and returning a status code corresponding to a connection success status to the fixed device after the communication connection is established successfully.

It will be understood that the HTTP connection request may include, but not limited to, an HTTP POST request in the prior art. Specifically, in the HTTP POST request, the IP address, preset port, unique identifier string, and operation instruction string information of the mobile device are spliced into a URL link, which is a link with an additional encrypted operation instruction string information. For example, additional data of http://192.168.1.36:100/wifi/api is xlneofneivhdui3w98, which is encrypted and indicates a specified operation instruction. The specific encryption method may be an existing encryption method or a customized encryption method, which is not limited herein.

The preset port that is listened on based on HTTP may be a free port of a mobile device, which is not limited herein. In addition, the preset port may be a pre-agreed port for the mobile device and the fixed device. Furthermore, in practice, a status code corresponding to a connection success status may be but is not limited to 200.

It should be noted that after the connection information of the fixed device is obtained and the HTTP connection request sent by the fixed device is received, the communication connection between the mobile device and the fixed device may be established with contents provided by HTTP. Furthermore, the protocol used in the establishing of the communication connection may be not limited to HTTP, and may be also other protocols in the prior art.

Furthermore, in order to maintain the communication connection between the mobile device and the fixed device, a heartbeat mechanism may be used, wherein the fixed device periodically sends an HTTP inquiry request to the mobile device, and the mobile device feeds back a response message after receiving the HTTP inquiry request. Based on the heartbeat mechanism, after the communication connection between the mobile device and the fixed device is established, the method for establishing a communication connection between a mobile device and a fixed device provided by the embodiment may further comprise:

receiving an HTTP inquiry request periodically sent by the fixed device;

returning a response message corresponding to the HTTP inquiry request to the fixed device.

An HTTP inquiry request is different from an HTTP connection request. Specific contents of the inquiry request may be set according to actual situations, and the response message corresponds to the HTTP inquiry request.

Based on the heartbeat mechanism described above, the method for establishing a communication connection between a mobile device and a fixed device provided by the embodiment may further comprise:

outputting first prompt information when no HTTP inquiry request sent by the fixed device is received for a predetermined period of time, the first prompt information being used to prompt that the communication connection between the mobile device and the fixed device has been disconnected.

The predetermined period of time may be set according to actual situations, which will not be described herein. When an HTTP inquiry request sent by the fixed device is not received for the predetermined period of time, it is indicated that the communication connection between the mobile device and the fixed device has been disconnected. In practice, it is reasonable to only wait for the communication connection request of the fixed device, rather than output the first prompt information.

In the second aspect, an embodiment of the present application provides a method for establishing a communication connection between a mobile device and a fixed device, from perspective of a fixed device.

It should be noted that, in practice, the mobile device may include a handheld device, such as smart phone, tablet computer and the like, and the fixed device may include a device such as desktop computer, laptop computer and the like.

Moreover, the functional software for implementing the method for establishing a communication connection between a mobile device and a fixed device provided in the embodiment may be a dedicated client software installed in the fixed device, or may also be a plug-in of an assistant client software or of a management client software installed in the fixed device. These are reasonable.

Figure 2:
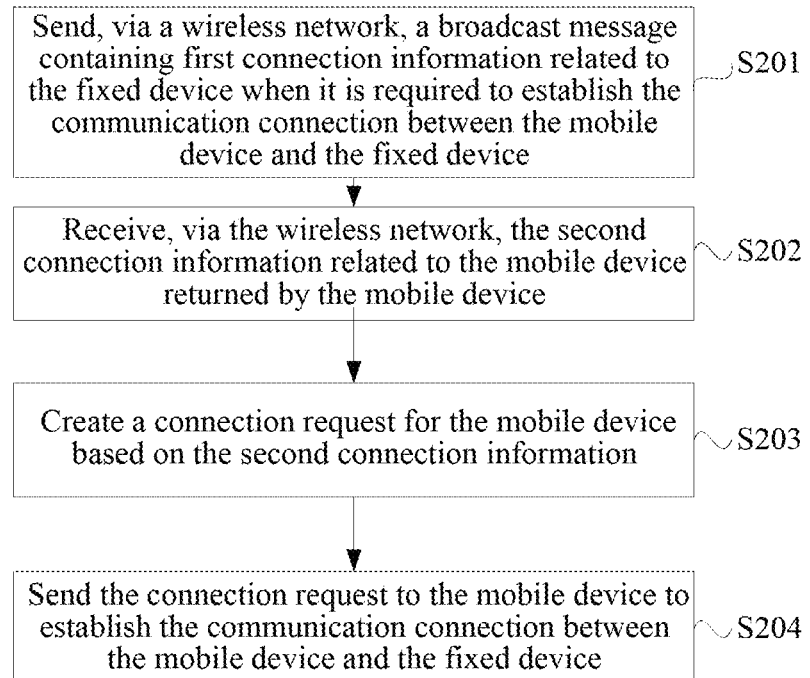
FIG. 2 is a flow chart of a method for establishing a communication connection between a mobile device and a fixed device, provided for a fixed device.

As shown in FIG. 2, the method for establishing a communication connection between a mobile device and a fixed device provided by the embodiment may comprise the following steps S201-S204.

In S201, a broadcast message containing first connection information of a fixed device is sent via a wireless network when it is required to establish the communication connection between the mobile device and the fixed device.

The fixed device may send a broadcast message containing first connection information related to the fixed device via a wireless network when it is required to establish a communication connection between the mobile device and the fixed device. Accordingly, the mobile device may receive, via the wireless network, the broadcast message containing the first connection information related to the fixed device sent by the fixed device.

The way to trigger the establishing of a communication connection between a mobile device and a fixed device may include a manual triggering by a user or a non-manual triggering by a user. For example, as to the manual triggering by a user, the user may perform a predetermined operation on an interaction interface presented by the fixed device to trigger the establishing of a communication connection between a mobile device and a fixed device. The predetermined operation may include but is not limited to an operation of clicking a button, a predetermined gesture operation or the like. As to the non-manual triggering by a user, the user may start a functional software, which implements the method for establishing a communication connection between a mobile device and a fixed device, in the fixed device to automatically trigger the establishing of a communication connection between a mobile device and a fixed device. These are reasonable.

It should be noted that, prerequisites for the implementation of the solution provided by the embodiment are that: (1) the mobile device and the fixed device are in the same wireless network, that is, share the same wireless network; (2) the mobile device has successfully established a communication connection with the fixed device via a USB cable once, and after the mobile device establishes the communication connection with the fixed device via the USB cable, the fixed device sends its own connection information to the mobile device, and the mobile device binds and stores the connection information after receiving the connection information sent by the fixed device. The connection information may include but is not limited to MAC address, IP address, name of the fixed device and the like. The mobile device may store the received connection information of the fixed device into a configuration file, and the present application is not limited thereto.

It will be understood that for the above prerequisites, the fixed device may automatically send its own connection information to the mobile device after the mobile device establishes the communication connection with the fixed device via the USB cable. Of course, the fixed device may pop up an inquiry message about whether the mobile device is to be bound, and when the user issues a binding instruction by responding to the inquiry message, the fixed device sends its own connection information to the mobile device. The inquiry message about whether the mobile device is to be bound may refer to FIG. 5, and it is not limited thereto.

It should be noted that after receiving, via the wireless network, the broadcast message containing the first connection information related to the fixed device sent by the fixed device, the mobile device may determine whether the connection information matches those of a fixed device that has been bound to the mobile device. When the connection information matches those of a fixed device that has been bound to the mobile device, the mobile device returns its own second connection information to the matching fixed device via the wireless network. In addition, the connection information of the fixed device that has been bound to the mobile device is received from the fixed device by the mobile device via a USB connection when the mobile device is connected to the fixed device via the USB connection. Further, the mobile device may receive connection information sent by multiple fixed devices and bind and save the connection information. The second connection information of the mobile device may include but is not limited to the MAC address, IP address, name of the mobile device and the like.

In S202, the second connection information related to the mobile device returned by the mobile device is received via the wireless network.

Since the mobile device returns its own second connection information to the fixed device via the wireless network when determining that the first connection information matches the connection information of the fixed device bound thereto, the fixed device may receive, via the wireless network, the second connection information related to the mobile device returned by the mobile device, and thereafter perform the subsequent processing based on the second connection information.

In S203, a connection request for the mobile device is created based on the second connection information.

In S204, the connection request is sent to the mobile device to establish the communication connection between the mobile device and the fixed device.

After the second connection information related to the mobile device is received, the connection request for the mobile device may be created based on the second connection information, and the connection request is sent to the mobile device to establish the communication connection between the mobile device and the fixed device.

Compared with the prior art, the solution provided by the embodiment only needs to establish a communication connection via a USB cable between the mobile device and the fixed device once, and the subsequent communication connections may be completed without the USB cable. Thus, the solution provided by the embodiment solves the problems that a USB cable is required for each communication connection and that mobile devices are subject to area limitations in the prior art.

Specifically, sending, via a wireless network, a broadcast message containing first connection information related to the fixed device may comprise:

sending, via the wireless network, the broadcast message containing the first connection information related to the fixed device using UDP.

Accordingly, receiving, via the wireless network, the second connection information related to the mobile device returned by the mobile device, may comprise:

receiving the second connection information related to the mobile device returned by the mobile device, via the wireless network using UDP.

The communication protocol used by the fixed device to send a broadcast message is not limited to UDP, and other communication protocols in the prior art may be used. These are reasonable. Moreover, a method in the prior art may be used to implement the step of sending, via the wireless network, a broadcast message containing first connection information related to the fixed device and the step of receiving, via the wireless network, the second connection information related to the mobile device returned by the mobile device.

Specifically, HTTP may be used to complete the establishment of communication connection. Therefore, in the solution provided by the embodiment of the present application, creating a connection request for the mobile device based on the second connection information, may comprise:

creating an HTTP connection request for a preset port of the mobile device based on the second connection information.

Accordingly, sending the connection request to the mobile device to establish the communication connection between the mobile device and the fixed device, may comprise:

sending the HTTP connection request for the preset port of the mobile device to the mobile device, such that the mobile device listens with a started port listening thread to obtain the HTTP connection request for the preset port of the mobile device, establishes a communication connection between the mobile device and the fixed device, and returns a status code corresponding to a connection success status to the fixed device after successfully establishing the communication connection; and receiving the status code corresponding to the connection success status returned by the mobile device to achieve the communication connection between the mobile device and the fixed device.

It will be understood that the HTTP connection request may include, but not limited to, an HTTP POST request in the prior art. Specifically, in the HTTP POST request, the IP address, preset port, unique identifier string, and operation instruction string information of the mobile device are spliced into a URL link, which is a link with an additional encrypted operation instruction string information. For example, additional data of http://192.168.1.36:100/wifi/api is xlneofneivhdui3w98, which is encrypted and indicates a specified operation instruction. The specific encryption method may be an existing encryption method or a customized encryption method, which is not limited herein.

The preset port may be a free port of a mobile device, which is not limited herein. In addition, the preset port may be a pre-agreed port for the mobile device and the fixed device. Furthermore, in practice, a status code corresponding to a connection success status may be but is not limited to 200.

It should be noted that after obtaining the connection information of the fixed device and receiving the HTTP connection request sent by the fixed device, the mobile device may establishes the communication connection between the mobile device and the fixed device with HTTP. Furthermore, the protocol used in the establishing of the communication connection may be not limited to HTTP, and may be also other protocols in the prior art.

Furthermore, in order to maintain the communication connection between the mobile device and the fixed device, a heartbeat mechanism can be used, wherein the fixed device periodically sends an HTTP inquiry request to the mobile device, and the mobile device feeds back a response message after receiving the HTTP inquiry request. Based on the heartbeat mechanism, in a first implementation, after sending the connection request to the mobile device to establish the communication connection between the mobile device and the fixed device, the method for establishing a communication connection between a mobile device and a fixed device provided by the embodiment may further comprise:

sending an HTTP inquiry request periodically to the mobile device; and re-performing the step of sending the connection request to the mobile device to establish the communication connection between the mobile device and the fixed device, if no response message corresponding to the HTTP inquiry request fed back by the mobile device is received after a predetermined number of times.

When no response message corresponding to the HTTP inquiry request fed back by the mobile device is received after a predetermined number of times, which indicates that the communication connection between the mobile device and the fixed device has been disconnected, a connection request may be sent by the fixed device to the mobile device to establish the communication connection between the mobile device and the fixed device. It will be understood that the predetermined number of times may be set according to actual situations, which will not be described herein.

In a second implementation, after sending the connection request to the mobile device to establish a communication connection between the mobile device and the fixed device, the method for establishing a communication connection between a mobile device and a fixed device provided by the embodiment may further comprise:

sending an HTTP inquiry request periodically to the mobile device; and outputting a second prompt message if no response message corresponding to the HTTP inquiry request fed back by the mobile device is received after a predetermined number of times, the second prompt message being used to prompt that the communication connection between the mobile device and the fixed device has been disconnected.

When no response message corresponding to the HTTP inquiry request fed back by the mobile device is received after a predetermined number of times, which indicates that the communication connection between the mobile device and the fixed device has been disconnected, a second prompt message is output, wherein the second prompt message is used to prompt that the communication connection between the mobile device and the fixed device has been disconnected.

In practice, the first implementation and the second implementation can be combined. For example, if a response message corresponding to the HTTP inquiry request fed back by the mobile device is not received after a predetermined number of times, the step of sending the connection request to the mobile device to establish the communication connection between the mobile device and the fixed device is re-performed. Further, if the communication connection is still not be successfully established after the reestablishing of the communication connection is performed the predetermined number of times, the second prompt message is output, which is used to prompt that the communication connection between the mobile device and the fixed device has been disconnected. Thus, the user may check the reason of the communication disconnection, and thereby may ensure a successful establishment of the communication connection between the mobile device and the fixed device.

The method for establishing a communication connection between a mobile device and a fixed device provided by embodiments of the present application will be described below in connection with a specific application example. The mobile device is a smart phone with a first mobile phone assistant installed thereon, and the fixed device is a PC provided with a second mobile phone assistant installed thereon. The first mobile phone assistant is a mobile phone side client of a mobile phone assistant A, and the second mobile phone assistant is a PC side client of the mobile phone assistant A.

Figure 5:
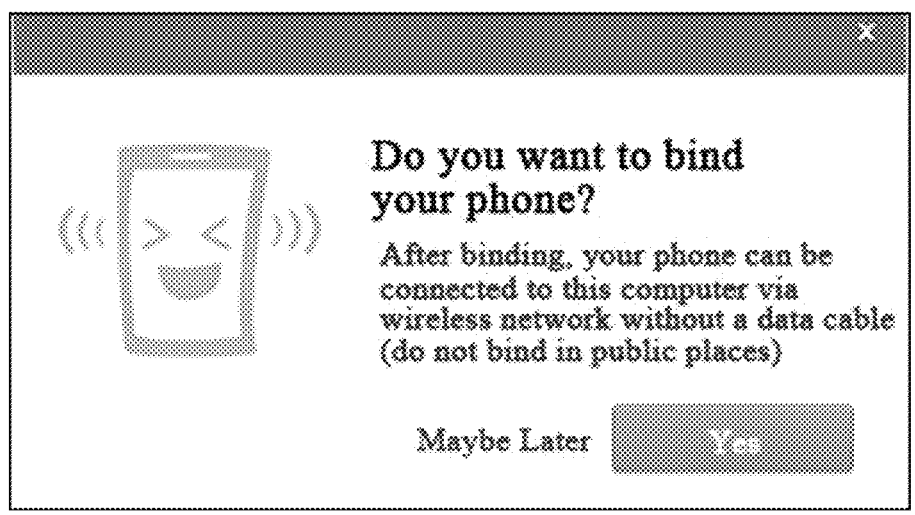
FIG. 5 is a diagram of an example of inquiry information popped up by a fixed device.

(1) Binding Process of a New Mobile Phone:

When establishing a communication connection between the PC and the smart phone for the first time, the user may physically connect the smart phone to the PC via a USB cable, and the second mobile phone assistant in the PC and the first mobile phone assistant in the smart phone complete the USB connection between the PC and the smart phone. After the connection is successfully established, the second mobile phone assistant pops up an inquiry message for inquiring whether the user wants to bind them, as shown in FIG. 5. After the user confirms the binding, the second mobile phone assistant sends first connection information of the PC to the smart phone, wherein the first connection information includes host name: AAA, IP address: 1.1.1.1, MAC address: X1-X2-X3-X4-X5-X6. After receiving the first connection information sent by the PC, the first mobile phone assistant in the smart phone creates a configuration file autoconnect.xml, and stores the first connection information in the configuration file autoconnect.xml.

(2) Establishment Process of Communication Connection after Binding when the second mobile phone assistant in the PC is started again by a user, the second mobile phone assistant sends a broadcast message containing the first connection information related to the PC via a wireless network using UDP, wherein the first connection information includes host name: AAA, IP address: 1.1.1.1, MAC address: X1-X2-X3-X4-X5-X6.

When the first mobile phone assistant in the smart phone in the wireless network is started by the user, the first mobile phone assistant receives the broadcast message sent by the second mobile phone assistant containing the first connection information related to the PC, reads the configuration file autoconnect.xml thereof, starts a port listening thread to listen on the preset port 2000 based on HTTP when determining that the connection information of a PC that has bound to the smart phone matches the first connection information, and returns a second connection information of the smart phone via the wireless network using UDP, wherein the second connection information includes host name: BBB, IP address: 1.1.1.2, MAC address: X7-X8-X9-X0-X1-X2.

the second mobile phone assistant receives the second connection information related to the smart phone returned by the first mobile phone assistant, via the wireless network using UDP, and creates an HTTP POST request based on the second connection information and sends it to the smart phone, which indicates that the PC is ready to start a connection, wherein the HTTP POST request is in the form of a URL, and the URL may be http://1.1.1.2:2000/wifi/api with data xxxx which is an encrypted data.

After receiving the HTTP POST request, the first mobile phone assistant establishes the communication connection between the smart phone and the PC, and returns a status code 200 corresponding to a connection success status to the PC. The second mobile phone assistant receives the status code 200 and completes the establishment of the communication connection between the smart phone and the PC, and then the second mobile phone assistant outputs a prompt information for prompting the user that the communication connection between the smart phone and the PC has been established, such that the user can perform other operations.

(3) Maintenance of Communication Connection Status Based on Heartbeat Mechanism

The second mobile phone assistant accesses the URL http://1.1.1.2:2000/wifi/api with specific encrypted data every 1 second in the form of an HTTP request. The first mobile phone assistant returns the status code 200 corresponding to the connection success status after receiving the access from the second mobile phone assistant of the PC. The second mobile phone assistant receives the status code and determines the connection is in normal status, and then the user can normally perform operations, such as operations of cleaning of the smart phone memory, installing of mobile phone apps and the like.

When the operations are finished, the user closes the second mobile phone assistant. If the first mobile phone assistant does not receive an HTTP request from the second mobile phone assistant for 3 seconds, it is indicated that the communication between the smart phone and the PC has been disconnected.

Thus, the problems that a USB cable is required for each communication connection the smart phone and the PC, and that mobile devices are subject to area limitations in the prior art can be solved by the application embodiment.

Figure 3:
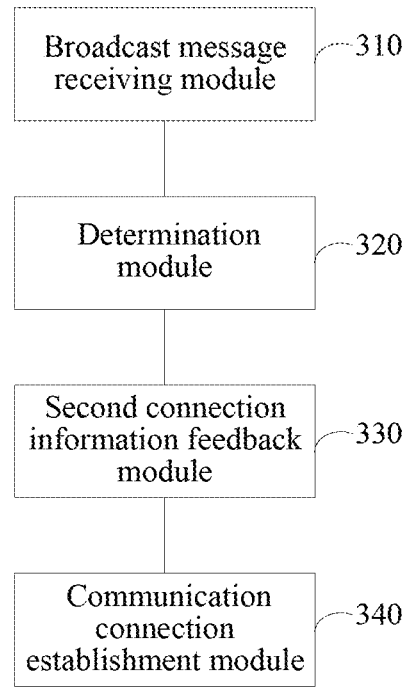
FIG. 3 is a schematic structural diagram of a device for establishing a communication connection between a mobile device and a fixed device, provided for a mobile device.

In the third aspect, from the perspective of mobile device, an embodiment of the present application provides an apparatus for establishing a communication connection between a mobile device and a fixed device, which is applied to a mobile device. As shown in FIG. 3, the apparatus may comprise:

a broadcast message receiving module 310, used to receive, via a wireless network, a broadcast message containing first connection information related to a fixed device sent by the fixed device;

a determination module 320, used to determine whether the first connection information in the received broadcast message matches connection information of a fixed device that has been bound to the mobile device, and if so, trigger a second connection information feedback module 330, wherein the connection information of the fixed device that has been bound to the mobile device is received from the fixed device by the mobile device via a USB connection when the mobile device is connected to the fixed device via the USB connection;

the second connection information feedback module 330, used to return a second connection information of the mobile device to the matching fixed device via the wireless network, such that the fixed device sends a connection request to the mobile device according to the second connection information;

a communication connection establishment module 340, used to receive the connection request to establish the communication connection between the mobile device and the fixed device.

Compared with the prior art, the solution provided by the embodiment only needs to establish a communication connection via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

Specifically, the broadcast message receiving module 310 is specifically used to:

receive, via the wireless network, the broadcast message containing the first connection information related to the fixed device sent by the fixed device using UDP.

The second connection information feedback module 330 is specifically used to return the second connection information of the mobile device to the matching fixed device via the wireless network using UDP.

Furthermore, the apparatus for establishing a communication connection between a mobile device and a fixed device provided by the embodiment, further comprises:

a thread starting module, used to start a port listening thread to listen on a preset port based on HTTP when the second connection information of the mobile device is returned to the matching fixed device via the wireless network.

The communication connection establishment module 340 is specifically used to:

listen with the port listening thread to obtain an HTTP connection request for the preset port of the mobile device; and establish the communication connection between the mobile device and the fixed device, and feed a status code corresponding to a connection success status back to the fixed device after successfully establishing the communication connection.

Furthermore, the apparatus for establishing a communication connection between a mobile device and a fixed device provided by the embodiment, further comprises:

an inquiry request receiving module, used to receive an HTTP inquiry request periodically sent by the fixed device after the communication connection between the mobile device and the fixed device is established; and a response message feedback module, used to feed a response message corresponding to the HTTP inquiry request back to the fixed device.

Furthermore, the apparatus for establishing a communication connection between a mobile device and a fixed device provided by the embodiment, further comprises:

a first prompt information output module, used to output first prompt information when no HTTP inquiry request sent by the fixed device is received for a predetermined period of time, the first prompt information being used to prompt that the communication connection between the mobile device and the fixed device has been disconnected.

By using the embodiment above, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

Figure 4:
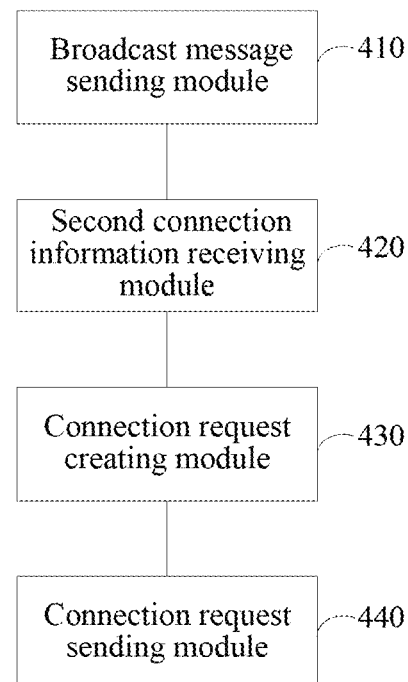
FIG. 4 is a schematic structural diagram of a device for establishing a communication connection between a mobile device and a fixed device, provided for a fixed device.

In the fourth aspect, from the perspective of fixed device, an embodiment of the present application provides an apparatus for establishing a communication connection between a mobile device and a fixed device, which is applied to a fixed device. As shown in FIG. 4, the apparatus may comprise:

a broadcast message sending module 410, used to send, via a wireless network, a broadcast message containing first connection information related to the fixed device when it is required to establish a communication connection between the mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a USB connection when the mobile device is connected to the fixed device via the USB connection;

a second connection information receiving module 420, used to receive, via the wireless network, the second connection information related to the mobile device returned by the mobile device;

a connection request creating module 430, used to create a connection request for the mobile device based on the second connection information; and a connection request sending module 440, used to send the connection request to the mobile device to establish the communication connection between the mobile device and the fixed device.

Compared with the prior art, the solution provided by the embodiment only needs to establish a communication connection via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

Specifically, the broadcast message sending module 410 is specifically used to:

send the broadcast message containing the first connection information related to the fixed device via the wireless network using UDP.

The second connection information receiving module 420 is specifically used to receive, via the wireless network, the second connection information related to the mobile device returned by the mobile device using UDP.

The connection request creating module 430 is specifically used to:

create an HTTP connection request for a preset port of the mobile device based on the second connection information.

The connection request sending module 440 is specifically used to send the HTTP connection request for the preset port of the mobile device to the mobile device, such that the mobile device listens with a started port listening thread to obtain the HTTP connection request for the preset port of the mobile device, establishes the communication connection between the mobile device and the fixed device, and returns a status code corresponding to a connection success status to the fixed device after successfully establishing the communication connection; and receive the status code corresponding to the connection success status fed back by the mobile device to achieve the communication connection between the mobile device and the fixed device.

Furthermore, the apparatus for establishing a communication connection between a mobile device and a fixed device provided by the embodiment, further comprises:

an inquiry request sending module, used to send an HTTP inquiry request periodically to the mobile device, after the connection request is sent to the mobile device to establish the communication connection between the mobile device and the fixed device; and a communication connection reestablishment module, used to resend the connection request to the mobile device to establish the communication connection between the mobile device and the fixed device if no response message corresponding to the HTTP inquiry request fed back by the mobile device is received after a predetermined number of times.

Furthermore, the apparatus for establishing a communication connection between a mobile device and a fixed device provided by the embodiment, further comprises:

an inquiry request sending module, used to send an HTTP inquiry request periodically to the mobile device, after the connection request is sent to the mobile device to establish the communication connection between the mobile device and the fixed device; and a second prompt message output module, used to output a second prompt message if no response message corresponding to the HTTP inquiry request fed back by the mobile device is received after a predetermined number of times, the second prompt message being used to prompt that the communication connection between the mobile device and the fixed device has been disconnected.

By applying the embodiment above, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

Figure 6:
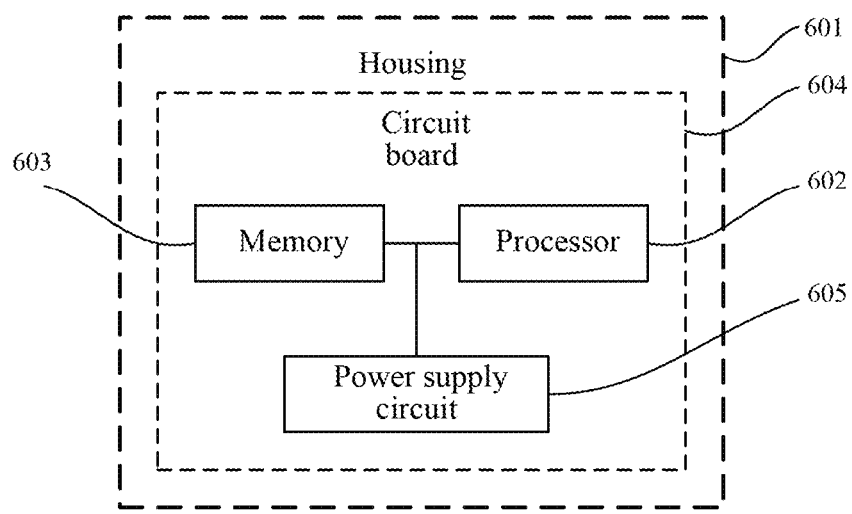
FIG. 6 is a schematic diagram of a structure of a mobile device provided from perspective of the mobile device.

In the fifth aspect, an embodiment of the present application further provides a mobile device. As shown in FIG. 6, the mobile device comprises a housing 601, a processor 602, a memory 603, a circuit board 604 and a power circuit 605. The circuit board 604 is disposed inside a space enclosed by the housing 601, and the processor 602 and the memory 603 are disposed on the circuit board 604. The power circuit 605 is used to supply power to various circuits or elements of the fixed device. The memory 603 is used to store an executable program code. The processor 602 executes a program corresponding to the executable program code by reading the executable program code stored in the memory 603 to perform the following steps of:

receiving, via a wireless network, a broadcast message containing first connection information related to a fixed device sent by the fixed device;

determining whether the first connection information in the received broadcast message matches connection information of a fixed device that has been bound to the mobile device, wherein the connection information of the fixed device that has been bound to the mobile device is received from the fixed device by the mobile device via a USB connection when the mobile device is connected to the fixed device via the USB connection;

if so, returning a second connection information of the mobile device to the matching fixed device via the wireless network, such that the fixed device sends a connection request to the mobile device according to the second connection information; and receiving the connection request to establish the communication connection between the mobile device and the fixed device.

The specific execution of the above steps by the processor 602 and the steps further executed by the processor 602 by executing the executable program code may refer to the description for the embodiments shown in FIGS. 1-5 of the present application, which will not be described herein.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

Figure 7:
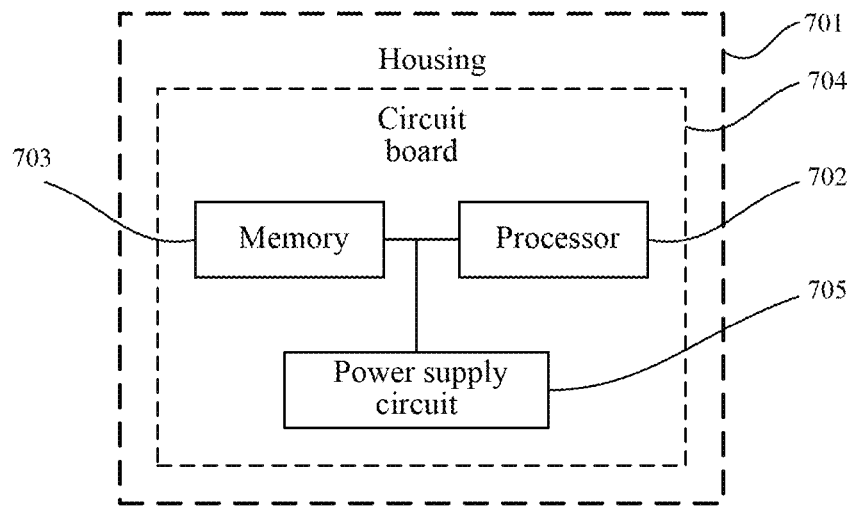
FIG. 7 is a schematic diagram of a structure of a fixed device provided from perspective of the fixed device.

In the sixth aspect, an embodiment of the present application further provides a fixed device. As shown in FIG. 7, the fixed device comprises a housing 701, a processor 702, a memory 703, a circuit board 704 and a power circuit 705. The circuit board 704 is disposed inside a space enclosed by the housing 701 and the processor 702 and the memory 703 are disposed on the circuit board 704. The power circuit 705 is used to supply power to various circuits or elements of the fixed device. The memory 703 is used to store an executable program code. The processor 702 executes a program corresponding to the executable program code by reading the executable program code stored in the memory 703 to perform the following steps:

sending, via a wireless network, a broadcast message containing first connection information related to the fixed device when it is required to establish the communication connection between a mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a USB connection when the mobile device is connected to the fixed device via the USB connection;

receiving, via the wireless network, the second connection information related to the mobile device returned by the mobile device;

creating a connection request for the mobile device based on the second connection information; and sending the connection request to the mobile device to establish the communication connection between the mobile device and the fixed device.

The specific execution of the above steps by the processor 702 and the steps further executed by the processor 702 by executing the executable code may refer to the description for the embodiments shown in FIGS. 1-5 of the present application, which will not be described herein.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

In the seventh aspect, an embodiment of the present application further provides an application program for performing a method for establishing a communication connection between a mobile device and a fixed device applied to a mobile device when being executed. The method for establishing a communication connection between a mobile device and a fixed device comprises:

receiving, via a wireless network, a broadcast message containing first connection information related to the fixed device sent by the fixed device;

determining whether the first connection information in the received broadcast message matches connection information of a fixed device that has been bound to the mobile device, wherein the connection information of the fixed device that has been bound to the mobile device is received from the fixed device by the mobile device via a USB connection when the mobile device is connected to the fixed device via the USB connection;

if so, returning a second connection information of the mobile device to the matching fixed device via the wireless network, such that the fixed device sends a connection request to the mobile device according to the second connection information; and receiving the connection request to establish the communication connection between the mobile device and the fixed device.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

In the eighth aspect, an embodiment of the present application provides an application program for performing a method for establishing a communication connection between a mobile device and a fixed device applied to a fixed device when being executed. The method for establishing a communication connection between a mobile device and a fixed device comprises:

sending, via a wireless network, a broadcast message containing first connection information related to the fixed device when it is required to establish the communication connection between the mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a USB connection when the mobile device is connected to the fixed device via the USB connection;

receiving, via the wireless network, the second connection information related to the mobile device returned by the mobile device;

creating a connection request for the mobile device based on the second connection information; and sending the connection request to the mobile device to establish the communication connection between the mobile device and the fixed device.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

In the ninth aspect, an embodiment of the present application provides a storage medium for storing an application program, wherein the application program is used to perform a method for establishing a communication connection between a mobile device and a fixed device applied to a mobile device.

The method for establishing a communication connection between a mobile device and a fixed device comprises:

receiving, via a wireless network, a broadcast message containing first connection information related to the fixed device sent by the fixed device;

determining whether the first connection information in the received broadcast message matches connection information of a fixed device that has been bound to the mobile device, wherein the connection information of the fixed device that has been bound to the mobile device is received from the fixed device by the mobile device via a USB connection when the mobile device is connected to the fixed device via the USB connection;

if so, returning a second connection information of the mobile device to the matching fixed device via the wireless network, such that the fixed device sends a connection request to the mobile device according to the second connection information; and receiving the connection request to establish the communication connection between the mobile device and the fixed device.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

In the tenth aspect, an embodiment of the present application provides a storage medium for storing an application program, wherein the application program is used to perform a method for establishing a communication connection between a mobile device and a fixed device applied to a fixed device. The method for establishing a communication connection between a mobile device and a fixed device comprises:

sending, via a wireless network, a broadcast message containing first connection information related to the fixed device when it is required to establish the communication connection between the mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a USB connection when the mobile device is connected to the fixed device via the USB connection;

receiving, via the wireless network, the second connection information related to the mobile device returned by the mobile device;

creating a connection request for the mobile device based on the second connection information; and sending the connection request to the mobile device to establish the communication connection between the mobile device and the fixed device.

As seen above, in the embodiment of the present application, a communication connection only needs to be established via a USB cable between the mobile device and the fixed device once, and the subsequent communication connections can be completed without the USB cable. Thus, the solution provided by the embodiment solves the problems that a USB cable is required for each communication connection and that mobile devices are subject to area limitations in the prior art.

For embodiments of an apparatus, a mobile device, a fixed device, an application program and a storage medium, since they are similar to the embodiments of the method, the description thereof is relatively simple; the relating parts may refer to the parts of the description of embodiments of the method.

It should be noted that, the relationship terms herein such as "first", "second" etc. are only used for distinguishing one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

It will be understood by those of ordinary skill in the art that all or some of the steps in the method described above may be accomplished by a program to instruct the associated hardware. Said program may be stored in a computer-readable storage medium, such as ROM/RAM, magnetic disks, optical disks, etc.

Embodiments described above are just preferred embodiments of the present application, and not intended to limit the scope of the present invention. Any modifications, equivalent, improvement or the like within the spirit and principle of the present invention should be included in the scope of the present invention.

The invention claimed is:

1. A method for establishing a communication connection between a mobile device and a fixed device, which is applied to the mobile device, the method comprising:
   receiving, via a wireless network, a broadcast message containing first connection information related to a fixed device sent by the fixed device;
   determining whether the first connection information in the received broadcast message matches connection information of a fixed device that has been bound to the mobile device, wherein the connection information of the fixed device that has been bound to the mobile device is received from the fixed device by the mobile device via a Universal Serial Bus (USB) connection when the mobile device is connected to the fixed device via the USB connection;
   if so, returning a second connection information of the mobile device to the matching fixed device via the wireless network, such that the fixed device sends a connection request to the mobile device according to the second connection information;
   starting a port listening thread to listen on a preset port based on HyperText Transport Protocol (HTTP); and
   receiving the connection request to establish a communication connection between the mobile device and the fixed device, comprising:
      listening with the port listening thread to obtain an HTTP connection request for the preset port of the mobile device; and
      establishing the communication connection between the mobile device and the fixed device, and feeding a status code corresponding to a connection success status back to the fixed device after the communication connection is established successfully.

2. The method according to claim 1, wherein receiving, via a wireless network, a broadcast message containing first connection information related to a fixed device sent by the fixed device, comprises:
   receiving, via the wireless network, the broadcast message containing the first connection information related to the fixed device sent by the fixed device using User Datagram Protocol (UDP); and
   returning a second connection information of the mobile device to the matching fixed device via the wireless network, comprises:
   returning the second connection information of the mobile device to the matching fixed device via the wireless network using UDP.

3. The method according to claim 1, wherein after establishing the communication connection between the mobile device and the fixed device, the method further comprises:
   receiving an HTTP inquiry request periodically sent by the fixed device; and
   feeding a response message corresponding to the HTTP inquiry request back to the fixed device.

4. The method according to claim 3, further comprising:
   outputting first prompt information when no HTTP inquiry request sent by the fixed device is received for a predetermined period of time, the first prompt information being used to prompt that the communication connection between the mobile device and the fixed device has been disconnected.

5. A storage medium for storing an application program to perform the method of claim 1.

6. A method for establishing a communication connection between a mobile device and a fixed device, which is applied to the fixed device, the method comprising:
   sending, via a wireless network, a broadcast message containing first connection information related to the fixed device when it is required to establish a communication connection between a mobile device and the fixed device, such that the mobile device receives, via the wireless network, the broadcast message containing the first connection information related to the fixed device sent by the fixed device, and when determining that the first connection information matches connection information of a fixed device that has been bound to the mobile device, returns a second connection information of the mobile device to the matching fixed device via the wireless network, wherein the connection information of the fixed device that has been bound to the mobile device is received from the fixed device by the mobile device via a Universal Serial Bus (USB) connection when the mobile device is connected to the fixed device via the USB connection;
   receiving, via the wireless network, the second connection information related to the mobile device returned by the mobile device;
   creating a HyperText Transport Protocol (HTTP) connection request for a preset port of the mobile device based on the second connection information; and
   sending the connection request to the mobile device to establish a communication connection between the mobile device and the fixed device, comprising:
      sending the HTTP connection request for the preset port of the mobile device to the mobile device, such that the mobile device listens with a started port listening thread to obtain the HTTP connection request for the preset port of the mobile device, establishes the communication connection between the mobile device and the fixed device, and feeds a status code corresponding to a connection success status back to the fixed device after successfully establishing the communication connection; and
      receiving the status code corresponding to the connection success status fed back by the mobile device to achieve the communication connection between the mobile device and the fixed device.

7. The method according to claim 6, wherein sending, via a wireless network, a broadcast message containing first connection information related to a fixed device, comprises:
   sending, via the wireless network, the broadcast message containing the first connection information related to the fixed device using User Datagram Protocol (UDP); and
   receiving, via the wireless network, the second connection information related to the mobile device returned by the mobile device, comprises:
   receiving, via the wireless network, the second connection information related to the mobile device returned by the mobile device using UDP.

8. The method according to claim 6, wherein after sending the connection request to the mobile device to establish the communication connection between the mobile device and the fixed device, the method further comprises:
   sending an HTTP inquiry request periodically to the mobile device; and
   re-performing the step of sending the connection request to the mobile device to establish the communication connection between the mobile device and the fixed device, if no response message corresponding to the HTTP inquiry request fed back by the mobile device is received after a predetermined number of times.

9. The method according to claim 6, wherein after sending the connection request to the mobile device to establish the communication connection between the mobile device and the fixed device, the method further comprises:
- sending an HTTP inquiry request periodically to the mobile device; and
- outputting a second prompt message, if no response message corresponding to the HTTP inquiry request fed back by the mobile device is received after a predetermined number of times, the second prompt message being used to prompt that the communication connection between the mobile device and the fixed device has been disconnected.

10. A storage medium for storing an application program to perform the method of claim 6.

11. An apparatus for establishing a communication connection between a mobile device and a fixed device, which is applied to the mobile device, the apparatus comprising:
- a broadcast message receiving module, used to receive, via a wireless network, a broadcast message containing first connection information related to a fixed device sent by the fixed device;
- a determination module, used to determine whether the first connection information in the received broadcast message matches connection information of a fixed device that has been bound to the mobile device, and if so, trigger a second connection information feedback module, wherein the connection information of the fixed device that has been bound to the mobile device is received from the fixed device by the mobile device via a Universal Serial Bus (USB) connection when the mobile device is connected to the fixed device via the USB connection;
- the second connection information feedback module, used to return a second connection information of the mobile device to the matching fixed device via the wireless network, such that the fixed device sends a connection request to the mobile device according to the second connection information;
- a thread starting module, used to start a port listening thread to listen on a preset port based on HyperText Transport Protocol (HTTP) when the second connection information of the mobile device is returned to the matching fixed device via the wireless network; and
- a communication connection establishment module, used to receive the connection request to establish a communication connection between the mobile device and the fixed device;

wherein, the communication connection establishment module is specifically used to:
- listen with the port listening thread to obtain an HTTP connection request for the preset port of the mobile device; and
- establish the communication connection between the mobile device and the fixed device, and feed a status code corresponding to a connection success status back to the fixed device after successfully establishing the communication connection.

12. The apparatus according to claim 11, wherein the broadcast message receiving module is specifically used to:
- receive, via the wireless network, the broadcast message containing the first connection information related to the fixed device sent by the fixed device using User Datagram Protocol (UDP); and
- the second connection information feedback module is specifically used to return the second connection information of the mobile device to the matching fixed device via the wireless network using UDP.

13. The apparatus according to claim 11, further comprising:
- an inquiry request receiving module, used to receive an HTTP inquiry request periodically sent by the fixed device after the communication connection between the mobile device and the fixed device is established;
- a response message feedback module, used to feed a response message corresponding to the HTTP inquiry request back to the fixed device.

14. The apparatus according to claim 13, further comprising:
- a first prompt information output module, used to output first prompt information when no HTTP inquiry request sent by the fixed device is received for a predetermined period of time, the first prompt information being used to prompt that the communication connection between the mobile device and the fixed device has been disconnected.

* * * * *